Figure 5:
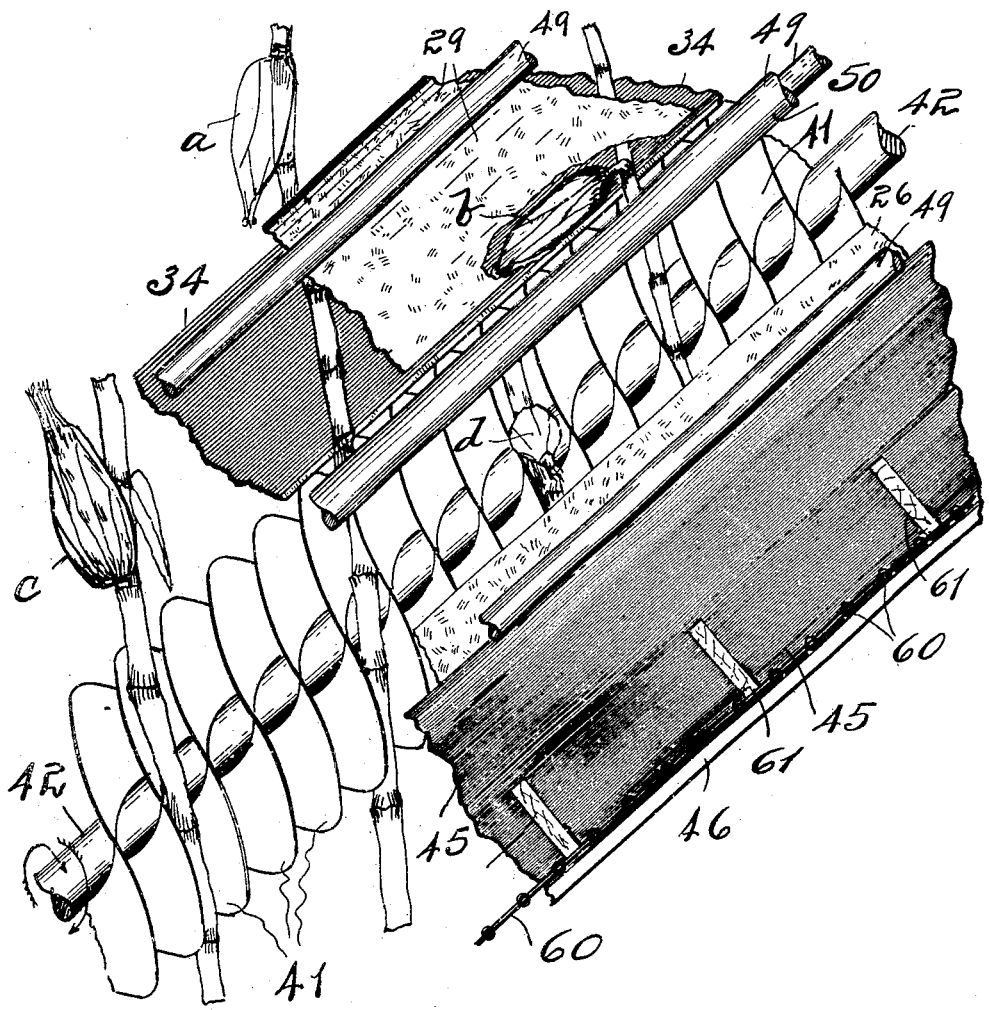

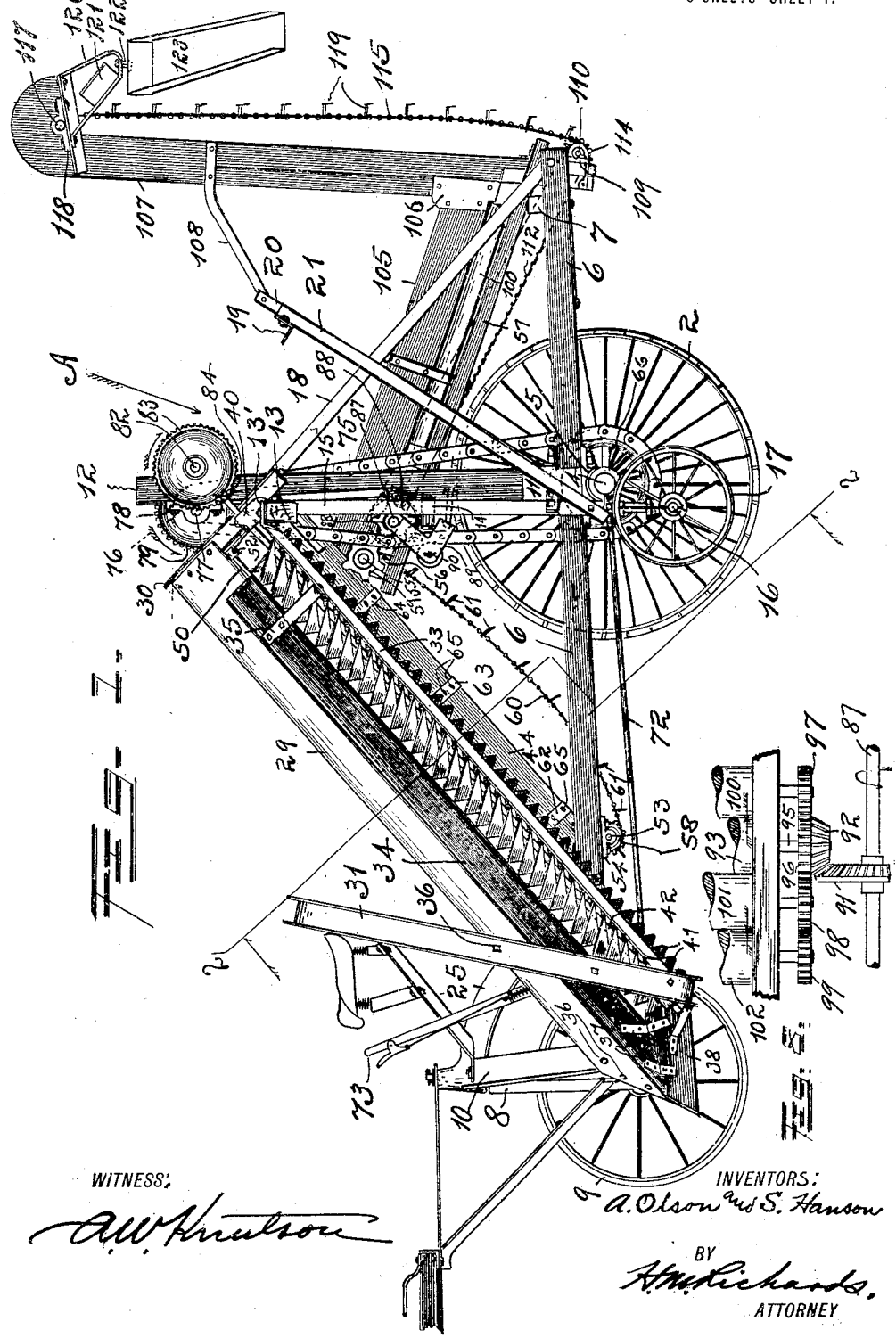

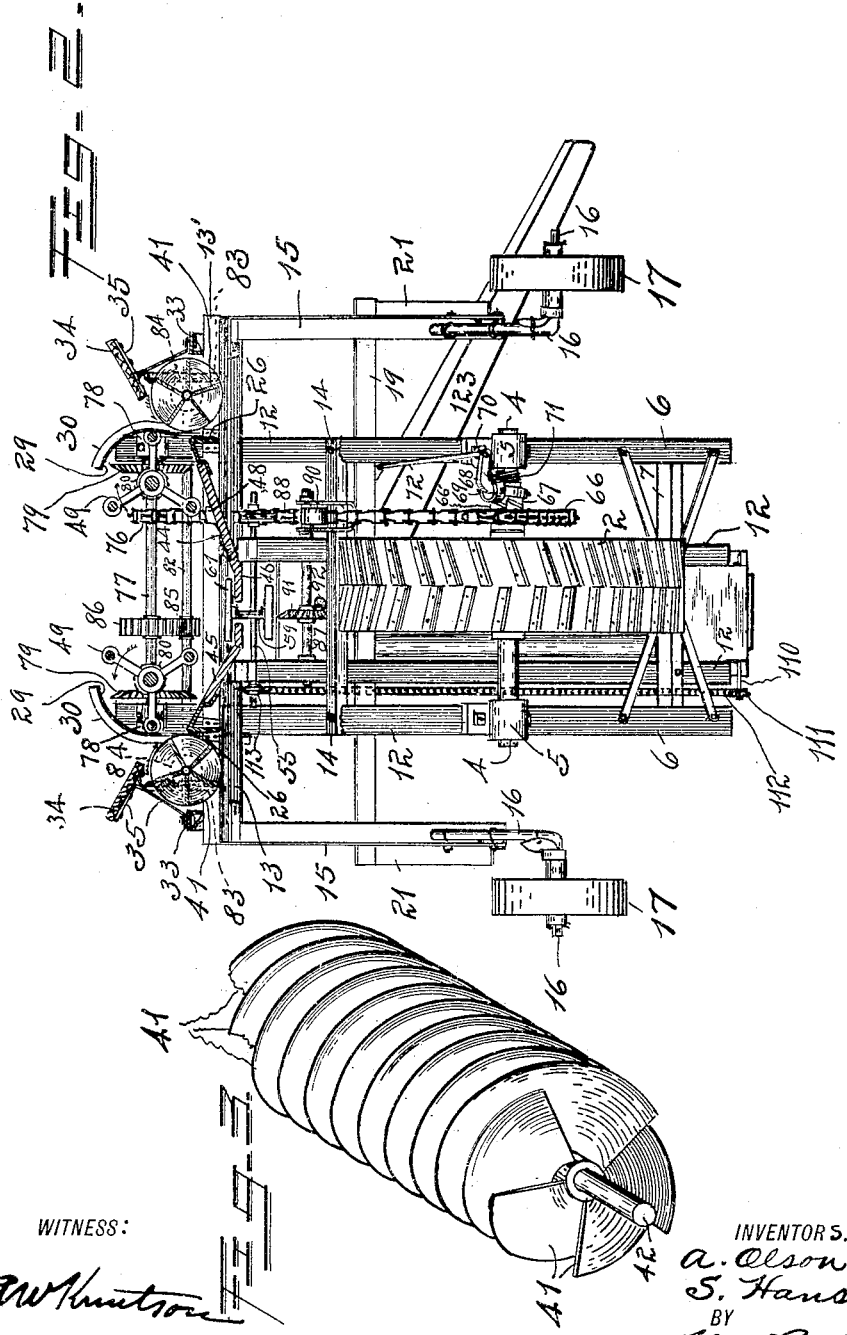

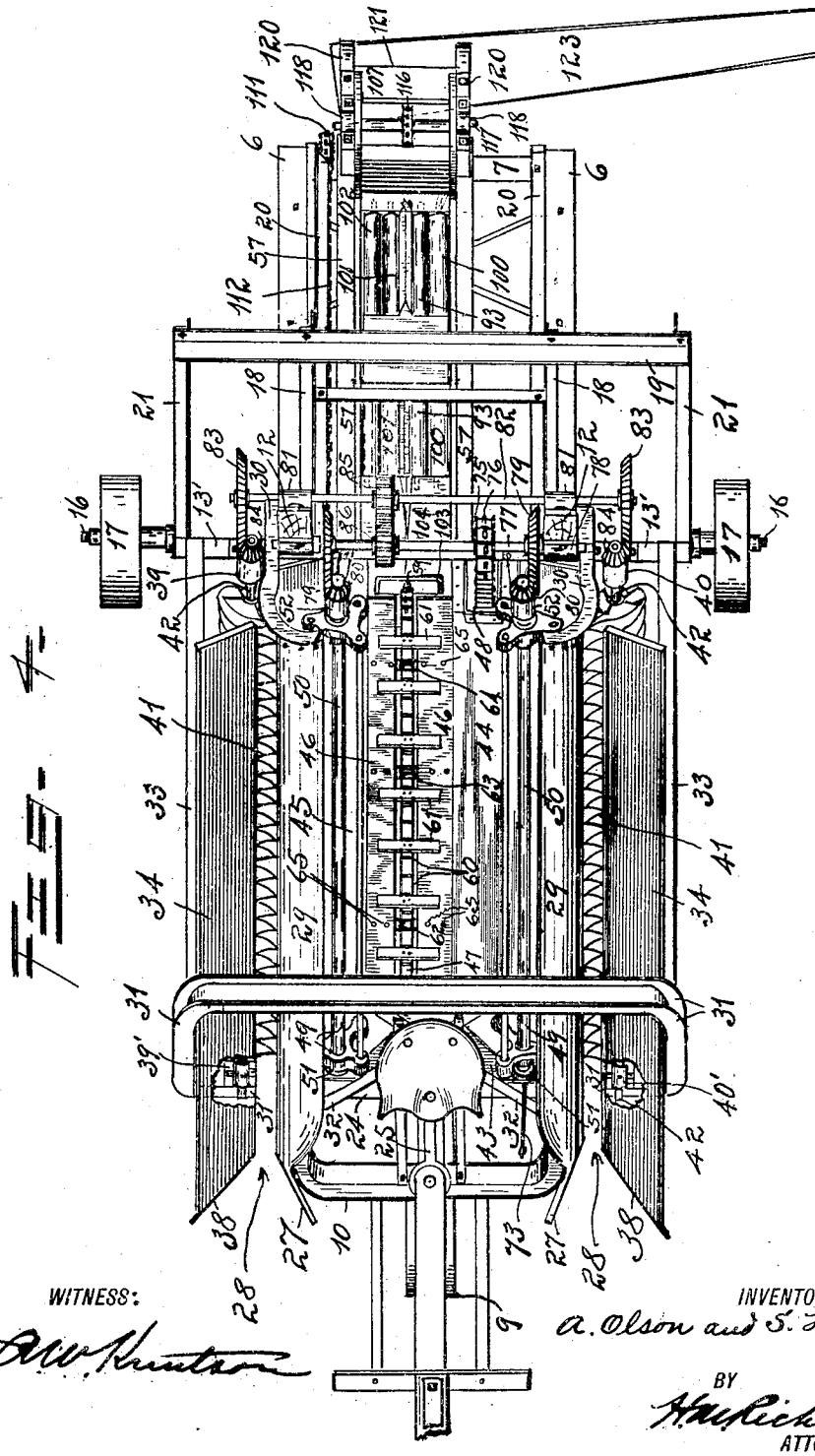

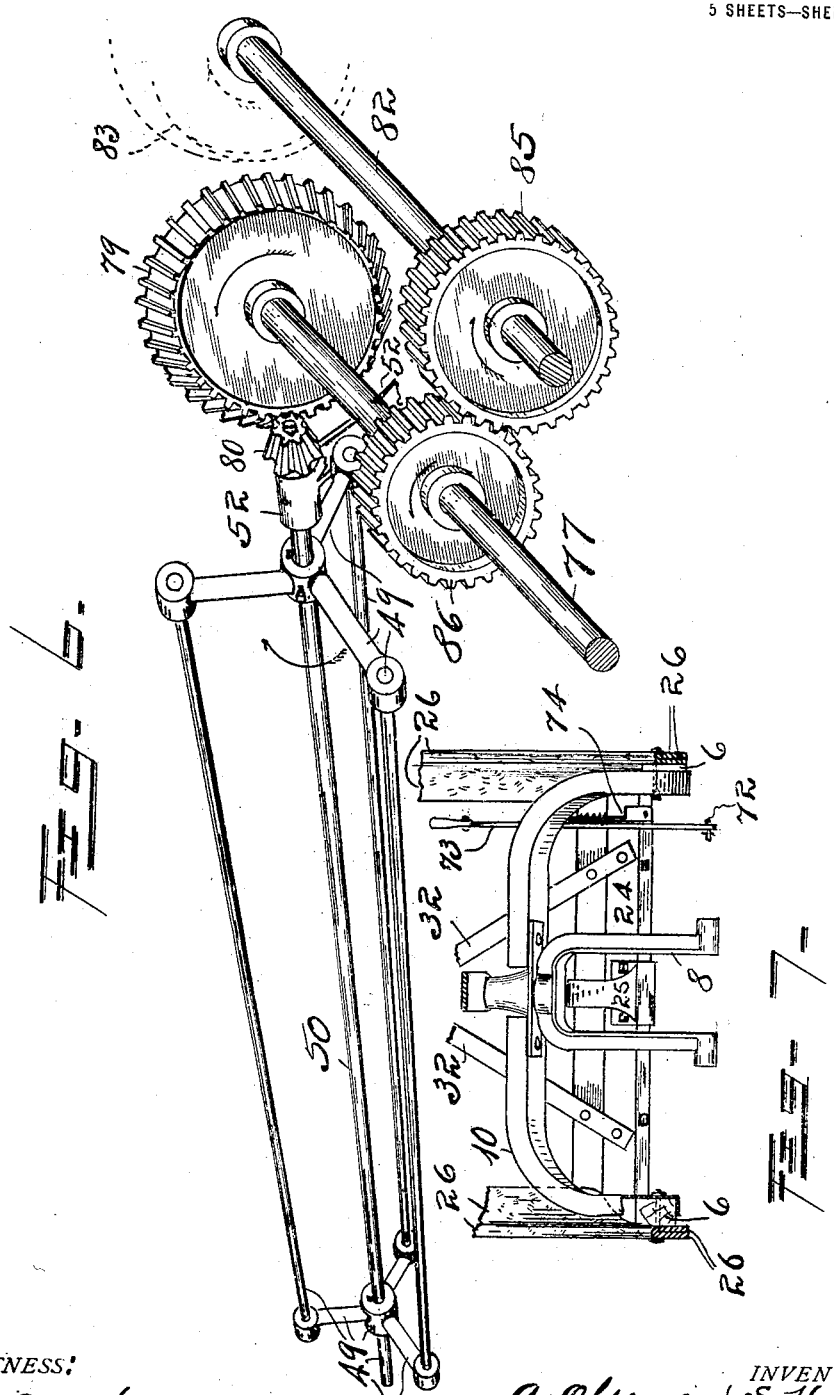

UNITED STATES PATENT OFFICE.

ANDERS OLSON AND SWAN HANSON, OF GALESBURG, ILLINOIS.

CORN-HARVESTING MACHINE.

1,336,578.  Specification of Letters Patent.  Patented Apr. 13, 1920.

Application filed June 9, 1917. Serial No. 173,902.

*To all whom it may concern:*

Be it known that we, ANDERS OLSON, a citizen of the United States, and SWAN HANSON, a subject of the King of Sweden, both of whom are residents of Galesburg, in the county of Knox and State of Illinois, have jointly invented a new and useful Corn-Harvesting Machine, of which the following is a specification.

Our invention relates to that general type of corn-harvesting machines which, as they are drawn through the field, remove the unhusked ear from the stalk, then remove the husk from the ear, and then deposit the ears in a wagon traveling alongside the machine.

The principal objects of our invention are to generally improve the construction and increase the capacity and efficiency of devices of this character, the improvements being directed more particularly toward the means for bringing the ears of corn into position for removal from the stalk; toward the means for removing them from the stalk; toward the arrangement and relationship of the husking elements to the other parts of the machine; toward the means for delivering the ears into the wagon; toward peculiar and novel constructions; toward the arrangements of the several elements, and toward their coaction.

The invention consists, substantially, in the improvements hereinafter specified.

In the accompanying drawings, which illustrate a preferred embodiment of our invention:

Figure 1 is a side elevation;

Fig. 2, a transverse section, taken in the plane of the line 2—2 in Fig. 1;

Fig. 3, an enlarged fragmental perspective of one of the spiral stalk-and-ear guides;

Fig. 4, a top plan;

Fig. 5, an enlarged perspective detail of fragments of the worm, the reel, and other elements coacting therewith;

Fig. 6, an enlarged perspective detail of one of the picker-reels;

Fig. 7, a detail—a front elevation of the yoke, the arch in which it is supported, and adjacent parts;

Fig. 8, an enlarged detail of the gear for driving the cleaning rolls, seen as if looking in the direction of the arrow A in Fig. 1.

Considering the drawings in detail, 2 indicates the traction and main supporting-wheel, fixed on an axle 4 mounted in bearings 5 secured to a pair of parallel side-frame-bars 6. 7 indicates a cross-bar connecting the rear ends of the bars 6. The front end of the machine is carried or supported upon the yoke or stock 8 of a caster-wheel 9, the stem of which is pivotally mounted in a bearing in a transversely arranged supporting-arch 10 the rear portions of which are turned rearwardly and secured to the front ends of the bars 6.

Secured by a bracket 11 to and near the mid-length of each bar 6 is a post 12. 13 denotes a cross-plate secured to and near the upper ends of said posts and extending transversely beyond them. 13' indicates an angle-iron reinforce-plate therefor. 14 designates a cross-bar secured to said posts just above the wheel 2. Secured to each end portion of the cross-plate 13 is the arm 15 of an axle 16 on each of which is mounted a wheel 17 normally out of contact with the ground. Diagonally disposed braces 18 connect the posts 12 each with the rear end of a bar 6. 19 indicates a horizontally arranged angle-iron brace-bar. 20, 20 denote braces arranged between and secured to said bar 19 and the posts 12, and 21, 21 designate similar braces the upper and lower ends of which are secured respectively to the bar 19 and to the arms 15.

The front ends of the frame-bars 6 are connected by a cross-beam 24. A curved bracket 25 is secured at its lower end to said beam and at its upper end to the arch 10.

Ear-guiding plates 26, triangular in cross-section, are secured at their upper ends each to the cross-plate 13 and near their lower ends to the forward end portions of the parallel bars 6. The front end of each plate 26 is extended forwardly and bent outwardly, and to it and the arch 10 is fixed a divergent plate 27 constituting one member of a mouth 28. Fixed to each plate 27 and also to the arch 10 and running rearwardly is a stalk-and-ear guiding-plate 29, (preferably concave on its inner face) the rear end of which is secured to a curved bracket 30 fixed to the adjacent post 12. A supporting arch 31 is secured by a crossed truss 32 to the cross-beam 24 and its ends are turned inwardly. Connecting each end portion of the arch 31 with the corresponding end of the cross-plate 13 is a combined guard and brace-rod 33. 34, 34 designate stalk-andear guiding-plates coöperating each with a plate 29 to direct and hold the stalks and ears in the manner presently set forth. Each plate 34 is secured to the adjacent rod 33 by a brace 35 and to the arch 31 by rivets 36 or in any other suitable manner. Secured to the front end of each plate 34 by braces 37 is a divergent plate 38 constituting the other member of the mouth 28. 39, 40 denote bearings secured on the cross-plate 13, and 39', 40' indicate bearings secured on the terminals of the arch 31. Secured in each coacting pair 39, 39' and 40, 40' of bearings is a multi-spiral worm 41 the shafts of which are numbered 42.

The hopper comprises an end 43 and bottom pieces 44, 45 and 46, the latter made in two spaced parts providing a way 47. The side pieces 44, 45 are inclined toward the pieces 46 and the piece 44 is provided with a chainway 48. 62, 63 and 64 designate hopper supporting straps, the ends of each of which are secured to the plates 26. Bolts, rivets or the like, numbered 65, secure the hopper parts to each of these supporting straps.

49, 49 designate combined ear-snapping and husk-removing reels, the shaft of each being designated by 50. The lower end of each of these shafts is mounted in a bearing 51 on the cross-beam 24 and its upper end in a bearing 52 on the plate 13.

53 denotes a shaft mounted in bearings 54 on the lower faces of the bars 6. 55 indicates a shaft mounted in bearings on blocks 56 secured each on one of a pair of diagonally arranged strips 57 carried by and suitably secured to the cross-pieces 7 and 14. A sprocket-wheel 58 is fixed on the shaft 53 and a like wheel 59 on the shaft 55. These wheels are embraced by a chain 60 to which is fixed ordinary elevator-strips 61.

Rotatably mounted on the axle 4 is a driving-sprocket 66. Slidably mounted on but held from rotation relatively to the axle is a clutch member 67 the teeth of which are adapted to be moved into and out of engagement with the teeth 66' of the wheel by means of a bell-crank lever 68 fulcrumed at 69 in a bracket 70. 71 designates a spring for pressing the member 67 toward the wheel. One end of a rod 72 is connected with the power arm of the bell-crank and its other with an operating lever 73 having the usual spring-actuated detent 74 coacting with a segment, not shown. By these or any other desired common means the driving-sprocket may be operatively connected with, to be driven by, the axle 4.

A sprocket-chain 75 embraces the wheel 66 and also a driven sprocket 76 fixed on a shaft 77 mounted in bearings 78 secured on the posts 12. 79, 79 designate bevel-gear wheels each of which is fixed on the shaft 77 and meshes with and drives a bevel-pinion 80 fixed on the upper end of the adjacent reel-shaft 50.

Mounted in bearings 81, 81 secured to the posts 12 is a shaft 82 on each end of which is fixed a bevel-gear wheel 83 which meshes with and drives a bevel-pinion 84 which is fixed on the upper end of one of the worm-shafts 42. The shaft 82 derives motion from a gear wheel 85 fixed thereon and driven by a wheel 86 fixed on and driven by the shaft 77.

Fixed on the shaft 55 is a sprocket wheel 59 which engages and drives the links of the chain 60.

87 indicates a shaft mounted in bearings on the cross-bar 14, and 88 denotes a sprocket wheel fixed thereon and driven by the chain 75. 89 denotes an idler-bracket, and 90 an idler carried thereby. 91 designates a bevel-spur-wheel fixed on the shaft 87. It meshes with and drives a bevel-pinion 92 which is fixed on the gudgeon or journal 95 of a husking or cleaning roll 93. Also fixed on the journal 95 is a gear-wheel 96 which meshes with wheels 97 and 98, the latter meshing also with a wheel 99. The wheels 96, 97, 98 and 99 drive the rollers 93, 100, 101 and 102. The ears of corn are delivered to said rolls by the conveyer slats 61 as they pass to and through an opening 103 in a chute 104 disposed between the hopper and the cleaning rolls. 105, 105 indicate sides for preventing the ears from falling off at the sides of the rollers.

Supported on the rear ends of the bars 57 and secured thereto by brackets 106 is an elevator chute 107. Braces 108 connect the chute-sides with the bars 20. Mounted in bearings 109 on the lower end of the chute is a shaft 110 on which is fixed a sprocket-wheel 111 which is embraced and driven by a chain 112 which embraces also a sprocket 113 on the shaft 55. Fixed also on the shaft 110 is a sprocket-wheel 114 which is embraced by a carrier-chain 115 which embraces also a sprocket 116 fixed on a shaft 117 mounted in bearings 118 on the sides of the upper end of the chute 107. 119, 119 denote the strips of the carrier 115.

Pendent loops 120 are secured one to each side of the chute 107. Between them is secured a guide-board 121. The lower end of each loop is provided with an aperture for the engagement of a hook or swivel 122 connected with the rear end of a spout 123 into which the ears of corn are dumped by the elevator slats 119. The free end of this is adapted to rest on the body of the wagon accompanying the picker.

The operation is substantially as follows: As the machine is drawn across the field two corn-rows will be straddled. A description of the operation of one side will suffice. The flared mouth 28 will guide the stalks between the guides 29 and 34 and these will direct the stalks into the spirals of the worm 41 and as these progress in their forward and rotary movements they will straighten up or erect every one of the stalks which has passed into said mouth and between said guides. The usual position of a mature ear of corn is as shown at *a*, Fig. 5—drooped. As the worm 41 moves onward the ear will be thrown into the position shown at *b*, same figure, or to a slightly lower one, where it will be struck by one of the rods of the rotating reel 49 and torn or snapped thereby from the stalk. The reel is rotating at such rate of speed that it will strike several light blows upon each ear before it passes into the hopper, thereby partly, at least, removing the husks. The ears are then taken up by the elevator 60—61 to the top of the machine, where they fall onto the inclined chute 104, down which they slide until they pass onto the cleaning or finishing rollers 93, 100, 101 and 102, these removing whatever husks and the silk which may still be clinging to the ears. The ears pass thence, by gravity, into the bottom of the elevator-chute 107, and will be carried by the chain 115—119 to the top of said chute 107, falling out onto the guide-board 121 and thence into the spout 123.

Again see Fig. 5. Frequently the ears stand erect, as shown at *c*. These are almost universally of greater diameter than the distance between adjacent spirals of the worm, and the latter will therefore tend to throw the ear to the position shown at *b* and it will be operated upon as above described; and even should an ear get into the unusual position indicated at *d* it will be struck by the reel-rods and acted upon as above described. In all of these operations the plates 26 guide the ears in their passage from the worm to the hopper. It is to be observed also that the concave faces of the guide-plates 29 conform to the arc of the circle described by each reel-rod.

The draft of the machine will be relatively light, for the traction wheel 2 sustains most of the weight—the rest being sustained by the caster-wheel 9. A special feature of our improvements resides in the auxiliary supporting-wheels 17 lying normally in a horizontal plane above that of the wheels 2 and 9. The inequalities of the ground of course tend to throw the machine from side to side as it passes along. It is obvious that when the machine is thus thrown from a perpendicular position to one which might cause danger of tipping sidewise, that that one of the wheels 17 which is on the downwardly inclined side will strike the ground and not only stop the tipping movement but also carry a part of the load until the machine rights itself.

We realize that considerable variation in the details of construction is, without departing from the spirit of our invention, possible. Therefore we do not desire to be understood as limiting our claims to the specific devices herein shown and described, except as pointed out in the following claims wherein it is our intention to claim as broadly as is permitted by the state of the art all the novelty inherent in the invention.

We therefore claim as new the following, namely:

1. In a corn harvesting machine, the combination of a frame, pairs of guide plates, arranged in spaced relation at the opposite sides of the frame for receiving corn stalks therebetween, a supporting worm arranged beneath each pair of plates to engage and support the stalks at opposite sides of the machine, ear snapping reels arranged lengthwise above each pair of plates for removing ears from the stalks and adapted to project the ears toward the intermediate portion of the frame, and a single hopper arranged longitudinally between the pairs of plates for receiving the detached and projected ears.

2. In a corn harvesting machine, the combination of a frame, stalk guides arranged along the opposite sides of the frame for receiving two rows of stalks, ear removing reels arranged at the inner sides of the guides, advancing means projecting into the guides to engage the stalks and hold the same in the path of said reels, a hopper arranged between the guides to receive the ears from both rows of stalks, a single means for removing the ears from the hopper, and a single set of husking rolls to receive said ears for removing the husks therefrom.

3. In a corn harvesting machine, the combination of a frame, guides at opposite sides of the frame for receiving rows of stalks therein, advancing worms journaled in the frame longitudinally of the guides and projecting into the sides thereof to engage the stalks, ear removing reels extending longitudinally of the guides at one side thereof to remove ears from the stalks, a hopper for receiving the detached ears from both of the guides, an endless conveyer for removing the stalks from the hopper, a set of husking rolls on the frame to which said conveyer is adapted to feed the ears, traction wheels on the frame, and a connection between the traction wheels and all of said movable elements for simultaneously driving the same when the machine is moved over the ground.

In testimony whereof we hereunto sign our names this fifth day of June, 1917, at Galesburg, Illinois.

ANDERS OLSON.
SWAN HANSON,